US006987608B2

(12) United States Patent
Nakaji

(10) Patent No.: US 6,987,608 B2
(45) Date of Patent: Jan. 17, 2006

(54) RAMAN AMPLIFIER

(75) Inventor: Haruo Nakaji, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/107,741

(22) Filed: Apr. 18, 2005

(65) Prior Publication Data

US 2005/0237601 A1 Oct. 27, 2005

(30) Foreign Application Priority Data

Apr. 23, 2004 (JP) ............................ 2004-128889

(51) Int. Cl.
*H01S 3/00* (2006.01)

(52) U.S. Cl. ...................................................... 359/334

(58) Field of Classification Search ................. 359/334
See application file for complete search history.

(56) References Cited

U.S. PATENT DOCUMENTS 6,785,042 B1 * 8/2004 Onaka et al. ............... 359/334
6,813,067 B1 * 11/2004 Birk et al. .................. 359/334

FOREIGN PATENT DOCUMENTS

EP 001503528 A1 * 2/2005

OTHER PUBLICATIONS

Emori et al.; "Broadband Lossless DCF Using Raman Amplification Pumped by Multichannel WDM Laser Diodes", *Electronics Letters:* c. 1998 IEEE; vol. 34 No. 22; Electronic Letters Online No. 19981509; Japan.

* cited by examiner

*Primary Examiner*—Mark Hellner
(74) *Attorney, Agent, or Firm*—McDermott Will & Emery LLP

(57) ABSTRACT

A Raman amplifier can easily reduce the gain variation in Raman amplification even when the power of an input signal varies. The Raman amplifier is provided with (a) an optical fiber that Amplifies an input lightwave to produce an output lightwave, (b) a pump-lightwave-supplying means that supplies pump lightwaves having a plurality of wavelengths to the optical fiber, and (c) a control unit that controls only the power of the pump lightwave having the shortest wavelength among the pump lightwaves so that the average value of the gain of the Raman amplification by the optical fiber in an intended wavelength range can be maintained constant.

8 Claims, 11 Drawing Sheets

RAMAN AMPLIFIER

BACKGROUND OF THE INVENTION

1. Field of the Invention

The present invention relates to a Raman amplifier.

2. Description of the Background Art

In Raman amplifiers, techniques have been proposed that enable the achievement of a flat gain spectrum by properly predetermining each value of the powers of pump lightwaves having a plurality of wavelengths. (See a literature written by Y. Emori et al., "Broadband lossless DCF using Raman amplification pumped by multichannel WDM laser diodes," Electron. Lett., Vol. 34, No. 22, pp. 2145–46, 1998, for example.) However, in the technique described in the above-described literature, in which each value of the powers of pump lightwaves having a plurality of wavelengths is a constant value, when the power of an input signal varies, a gain variation is created due to a saturation tendency of the gain in Raman amplification.

SUMMARY OF THE INVENTION

An object of the present invention is to offer a Raman amplifier that can easily reduce the gain variation in Raman amplification even when the power of an input signal varies.

To attain the foregoing object, the present invention offers a Raman amplifier that is provided with:

(a) an optical fiber that Amplifies an input lightwave to produce an output lightwave;

(b) a pump-lightwave-supplying means that supplies pump lightwaves having a plurality of wavelengths to the optical fiber; and (c) a control unit that controls only the power of the pump lightwave having the shortest wavelength among the pump lightwaves so that the average value of the gain of the Raman amplification by the optical fiber in an intended wavelength range can be maintained constant.

According to an aspect of the present invention, the Raman amplifier may have the following features. The Raman amplifier is further provided with an input-power-detecting means that detects the power of the input lightwave, and the control unit performs the following functions:

(a) to memorize a relationship between the power of the pump lightwave having the shortest wavelength and the power of the input lightwave to be established to maintain the foregoing average value constant; and (b) to control the power of the pump lightwave having the shortest wavelength in accordance with both the power of the input lightwave detected by the input-power-detecting means and the relationship it memorizes.

In this case, the foregoing relationship may be a relationship expressed as a linear function. Furthermore, in this case, the Raman amplifier may have the following features:

(a) the pump-lightwave-supplying means supplies to the optical fiber the pump lightwaves in the direction opposite to the traveling direction of the input lightwave; and (b) the input-power-detecting means or the control unit is provided with a retarding means for giving a retarding time corresponding to the time needed for the input lightwave to travel over the optical fiber.

Alternatively, the Raman amplifier may have the following features:

(a) the pump-lightwave-supplying means supplies to the optical fiber the pump lightwaves in the same direction as the traveling direction of the input lightwave; and (b) the Raman amplifier is further provided with a retarding medium for retarding the input lightwave by a predetermined time, the retarding medium being placed between the input-power-detecting means and the pump-lightwave-supplying means both placed on a path for the input lightwave.

Here, the predetermined time may be the time from the instant when the input-power-detecting means detects a value to the instant when the control unit performs the control.

According to another aspect of the present invention, the Raman amplifier may have the following features. The Raman amplifier is further provided with:

(d) an input-power-detecting means that detects the power of the input lightwave; and (e) an output-power-detecting means that detects the power of the output lightwave, and the control unit controls the power of the pump lightwave having the shortest wavelength in accordance with both the power of the input lightwave detected by the input-power-detecting means and the power of the output lightwave detected by the output-power-detecting means. In this case, the control unit may control the power of the pump lightwave having the shortest wavelength in accordance with both the power of the input lightwave detected by the input-power-detecting means and the power of the output lightwave detected by the output-power-detecting means, the power of the output lightwave being detected at the instant when a time needed for the input lightwave to travel over the optical fiber has just elapsed from the instant when the power of the input lightwave is detected.

Advantages of the present invention will become apparent from the following detailed description, which illustrates the best mode contemplated to carry out the invention. The invention can also be carried out by different embodiments, and their details can be modified in various respects, all without departing from the invention. Accordingly, the accompanying drawing and the following description are illustrative in nature, not restrictive.

BRIEF DESCRIPTION OF THE DRAWING

The present invention is illustrated to show examples, not to show limitations, in the figures of the accompanying drawing. In the drawing, the same reference signs and numerals refer to similar elements.

In the drawing.

DETAILED DESCRIPTION OF THE INVENTION

The present inventor intensely studied the gain control of the Raman amplification and found that it is possible to reduce the variation in the gain spectrum by controlling only the power of the pump lightwave having the shortest wavelength among the pump lightwaves having a plurality of wavelengths even when the power of the input signal lightwave varies. Thus, the present invention was accomplished.

The First Embodiment

Figure 1:
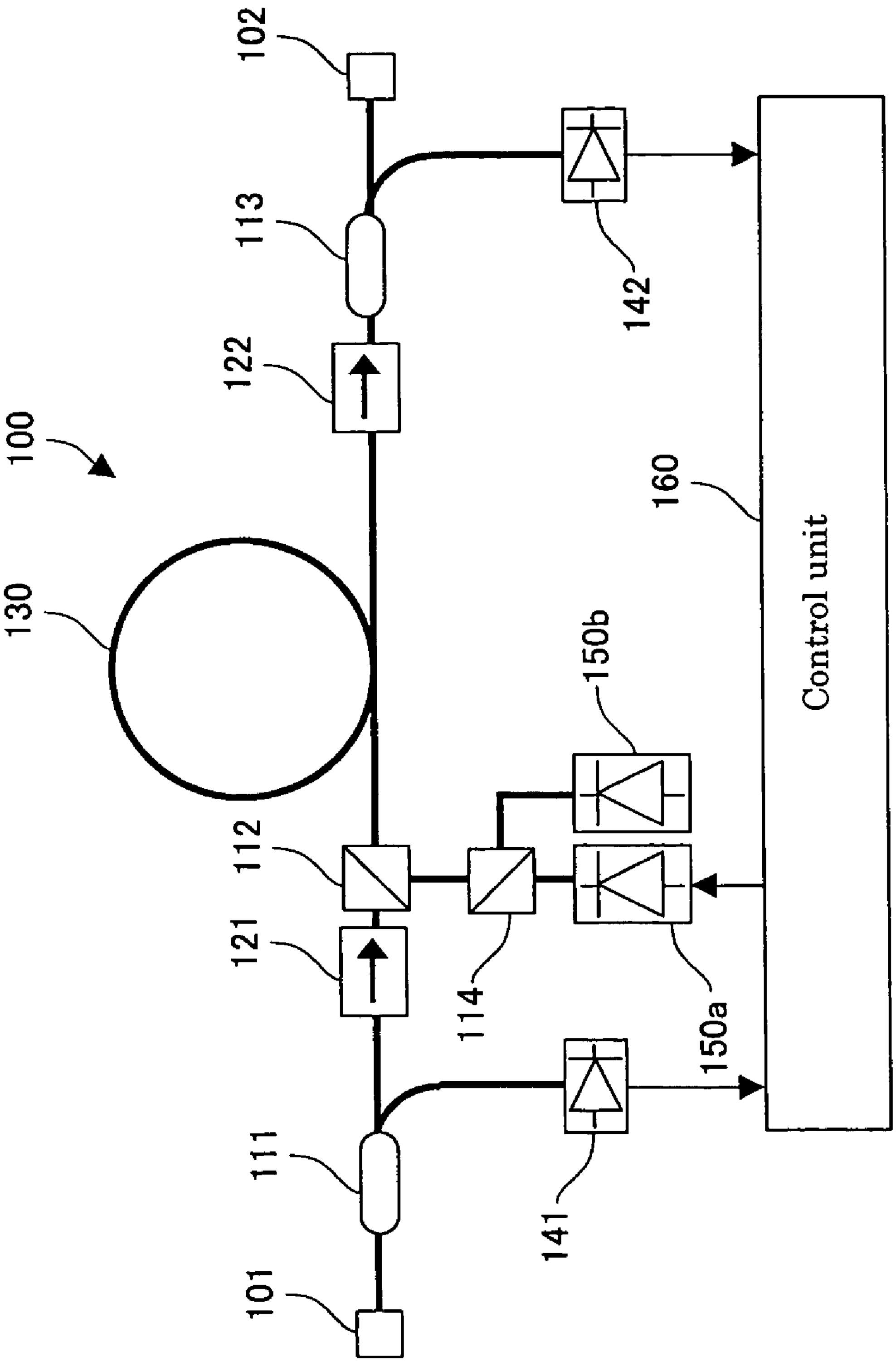
FIG. 1 is a conceptual diagram showing a Raman amplifier of the first embodiment of the present invention.

FIG. 1 is a conceptual diagram showing a Raman amplifier 100 of the first embodiment of the present invention. In the Raman amplifier 100, a signal lightwave (input lightwave) enters at a light-entering end 101 and is Raman-amplified. The Raman-amplified signal lightwave (output lightwave) exits from a light-exiting end 102. The Raman amplifier 100 is provided with on the signal-lightwave-propagating path from the light-entering end 101 to the light-exiting end 102 a fiber optic coupler 111, an optical isolator 121, a fiber optic coupler 112, a Raman-amplifying optical fiber 130, an optical isolator 122, and a fiber optic coupler 113 in this order. In addition, the Raman amplifier 100 is provided with a photodiode 141 connected to the fiber optic coupler 111, a fiber optic coupler 114 connected to the fiber optic coupler 112, laser diodes 150*a* and 150*b* connected to the fiber optic coupler 114, a photodiode 142 connected to the fiber optic coupler 113, and a control unit 160 connected to the photodiodes 141 and 142 and the laser diode 150*a*.

The fiber optic coupler 111 branches a signal lightwave having entered at the light-entering end 101 to send some portion of it to the photodiode 141 and the remaining portion to the optical isolator 121. The photodiode 141 receives the signal lightwave having arrived from the fiber optic coupler 111 to produce an electric signal in accordance with the power of the inputted signal lightwave and sends it to the control unit 160.

The fiber optic coupler 112 receives pump lightwaves having a plurality of wavelengths sent from the fiber optic coupler 114 and sends them to the optical fiber 130. The fiber optic coupler 112 receives a signal lightwave having traveled from the fiber optic coupler 111 via the optical isolator 121 and sends it to the optical fiber 130.

The fiber optic coupler 113 receives a signal lightwave having traveled from the optical fiber 130 via the optical isolator 122 and branches it to send some portion of it to the photodiode 142 and the remaining portion to the light-exiting end 102. The photodiode 142 receives the signal lightwave having arrived from the fiber optic coupler 113 to produce an electric signal in accordance with the power of the inputted signal lightwave and sends it to the control unit 160.

The fiber optic coupler 114 receives pump lightwaves having wavelengths different from each other sent from the laser diodes 150*a* and 150*b*. Then, it combines the pump lightwaves and sends the combined pump lightwaves having a plurality of wavelengths to the fiber optic coupler 112. The optical isolators 121 and 122 allow lightwaves to pass in a forward direction from the light-entering end 101 to the light-exiting end 102 and prevent them from passing in a backward direction. The optical fiber 130 receives pump lightwaves and a signal lightwave both sent from the fiber optic coupler 112 and Raman-amplifies the signal lightwave to send the Raman-amplified signal lightwave to the optical isolator 122.

The laser diodes 150*a* and 150*b* each output a pump lightwave for Raman amplification having a wavelength different from each other. Here, it is assumed that the wavelength of the pump lightwave outputted from the laser diode 150*a* is shorter than that of the pump lightwave outputted from the laser diode 150*b*. In other words, it is assumed that the pump lightwave outputted from the laser diode 150*a* is the pump lightwave having the shortest wavelength among the pump lightwaves having a plurality of wavelengths.

The control unit 160 receives the electric signals sent from the photodiodes 141 and 142 to control the power of the pump lightwave to be outputted from the laser diode 150*a* in accordance with these electric signals so that the gain of the Raman amplification can become constant. Specifically, it is desirable that the control unit 160 be structured with an electric circuit for performing the control or the like.

Here, the laser diodes 150*a* and 150*b* and the fiber optic couplers 112 and 114, as a whole, act as a pump-lightwave-supplying means that supplies pump lightwaves having a plurality of wavelengths to the optical fiber 130. As the pump-lightwave-supplying means, the laser diode may be replaced with another laser light source. The photodiode 141 and the fiber optic coupler 111, as a whole, act as an input-power-detecting means that detects the power of the signal lightwave to be inputted into the optical fiber 130. The photodiode 142 and the fiber optic coupler 113, as a whole, act as an out- put-power-detecting means that detects the power of the output signal lightwave outputted from the optical fiber.

The Raman amplifier 100 operates as described below. Pump lightwaves outputted from the laser diodes 150*a* and 150*b* are combined by the fiber optic coupler 114. The combined pump lightwaves are supplied to the Raman-amplifying optical fiber 130 via the fiber optic coupler 112. A signal lightwave having entered at the light-entering end 101 travels through the fiber optic coupler 111, the optical isolator 121, and the fiber optic coupler 112 and enters the optical fiber 130 to be Raman-amplified there. The Raman-amplified signal lightwave travels through the optical isolator 122 and the fiber optic coupler 113 and exits from the light-exiting end 102.

The signal lightwave having entered at the light-entering end 101 is branched by the fiber optic coupler 111, and some portion of it is sent to the photodiode 141. Then, the photodiode 141 outputs an electric signal in accordance with the amount of the light it receives. The Raman-amplified signal lightwave is branched by the fiber optic coupler 113, and some portion of it is sent to the photodiode 142. Then, the photodiode 142 outputs an electric signal in accordance with the amount of the light it receives.

The control unit 160 monitors the power of the input signal lightwave in accordance with the electric signal sent from the photodiode 141. It also monitors the power of the output signal lightwave in accordance with the electric signal sent from the photodiode 142. The control unit 160 calculates the gain of the Raman amplification using the monitored powers of the input and output signal lightwaves. Then, it controls the power of the pump lightwave to be outputted from the laser diode 150*a* so that the gain of the Raman amplification can become constant.

An example of this embodiment is explained below. It is assumed that the optical fiber 130 is a dispersion-compensating fiber having a length of 9.9 km. It is assumed that the center wavelength of the pump lightwave outputted from the laser diode 150*a* is 1,435.4 nm, and that from the laser diode 150*b* is 1,462.2 nm. Signal lightwaves are inputted into the Raman amplifier 100 over 32 channels, which are distributed in a band of 1,534.25 to 1,558.98 nm at intervals of 100 GHz in frequency. The signal lightwaves in the individual channels have the same power.

Figure 2:
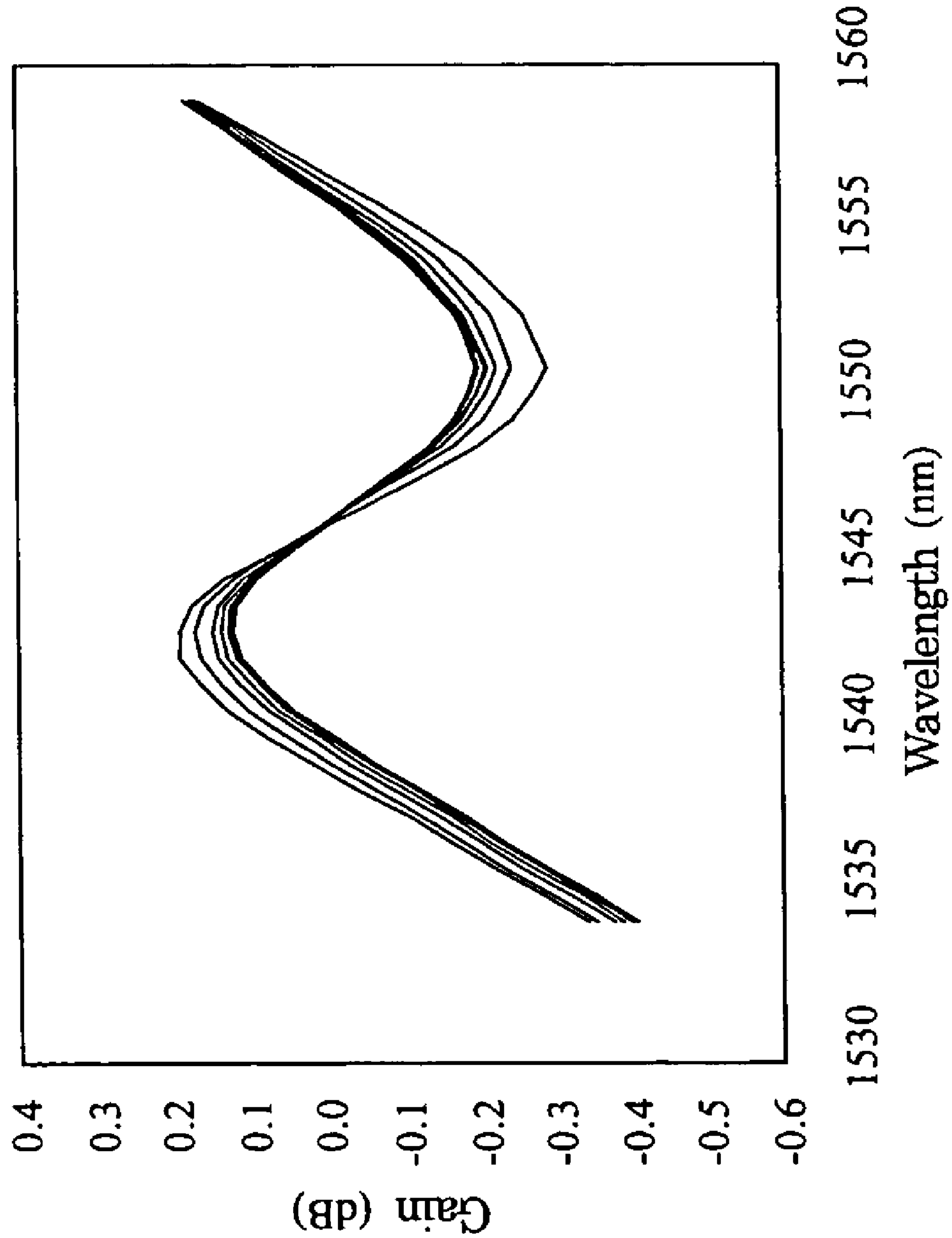
FIG. 2 is a graph showing a gain spectrum of a Raman amplifier of the first embodiment using the power of the input signal lightwave as a parameter.

The power of the input signal lightwave was varied from −32 dBm/ch to −5 dBm/ch, and the control unit 160 performed a control operation such that the average gain in the band of the signal lightwave became constant. In this case, the power of the pump lightwave outputted from the laser diode 150*b* was maintained constant. FIG. 2 is a graph showing a gain spectrum of the Raman amplifier of the first embodiment using the power of the input signal lightwave as a parameter. Even though the power of the input signal lightwave was varied from −32 dBm/ch to −5 dBm/ch (the variation is 27 dB), the gain variation was suppressed to about ±0.1 dBpp.

Figure 3:
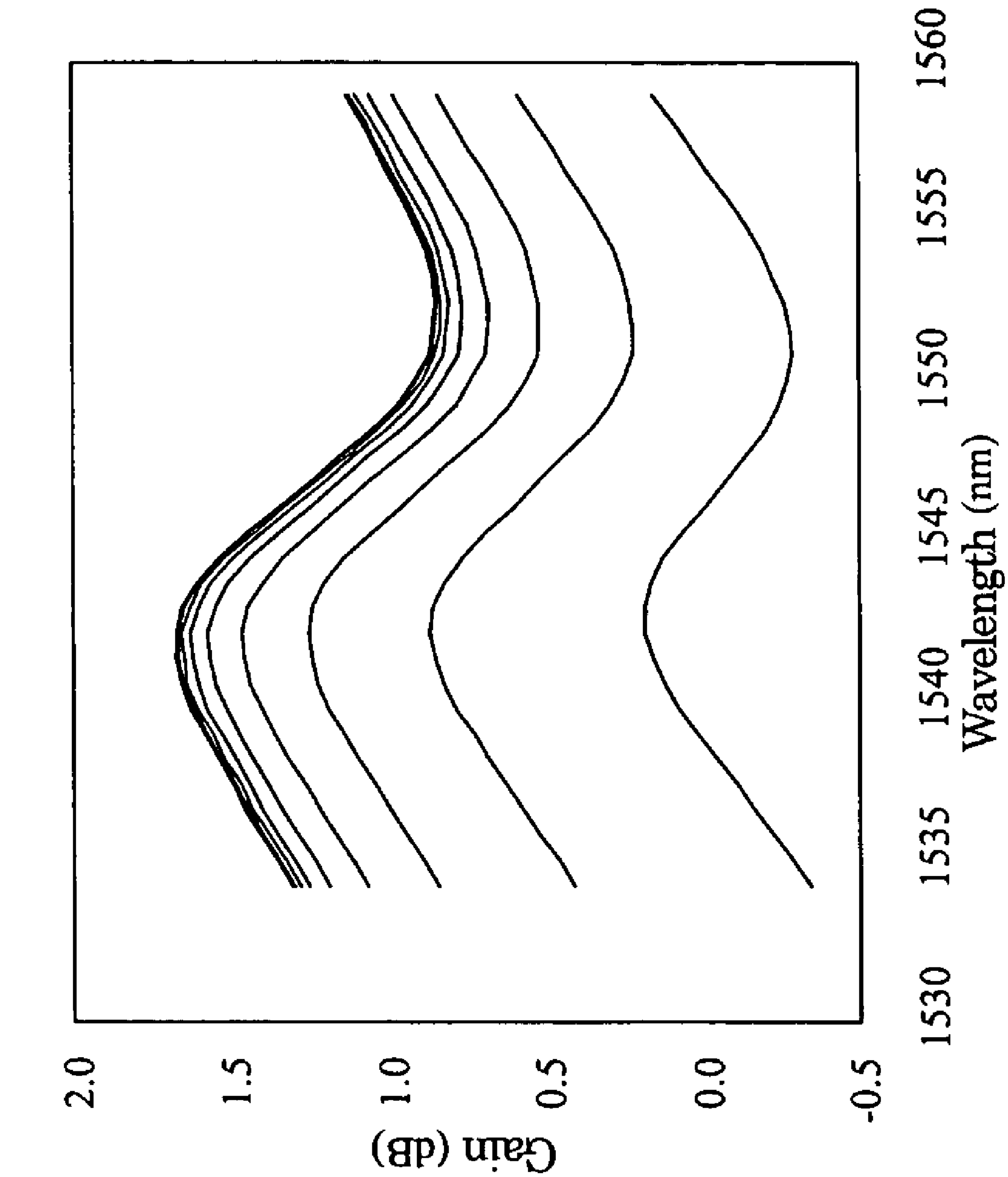
FIG. 3 is a graph showing a gain spectrum of a Raman amplifier of the first embodiment using the power of the input signal lightwave as a parameter when the power of the pump lightwaves was not controlled as a comparative example.

As a comparative example for the above-described control, another Raman amplification was conducted under the same condition as above, except that the power of the pump lightwave outputted from the laser diode 150*a* was not controlled (the power of the pump lightwave in individual channels is maintained constant). FIG. 3 is a graph showing a gain spectrum of a Raman amplifier of the first embodiment using the power of the input signal lightwave as a parameter when the power of the pump lightwaves was not controlled as Comparative example 1. In this case, the power of the pump lightwave outputted from each of the laser diodes 150*a* and 150*b* was predetermined such that when the power of the input signal lightwave was −5 dBm/ch, the average value of the net gain was about 0 dB and the gain spectrum became more flattened than in any other cases. In Comparative example 1, a gain variation of about 1.5 dBpp was produced at the maximum. In addition, as the power of the input signal lightwave decreased, the gain increased.

The result obtained in the example of the first embodiment shows that even when the power of the input signal lightwave varies, the stability of the gain spectrum can be achieved by controlling only the power of the pump lightwave having the shortest wavelength so that the average gain in the band of the signal lightwave can become constant. In other words, the first embodiment enables an easy reduction in the gain variation in the Raman amplification. Furthermore, as explained in the first embodiment, when the powers of the input and output signal lightwaves are monitored and the obtained values are referred to control the power of the pump lightwave having the shortest wavelength, a more proper control of the gain variation in the Raman amplification can be performed.

The Second Embodiment

Figure 4:
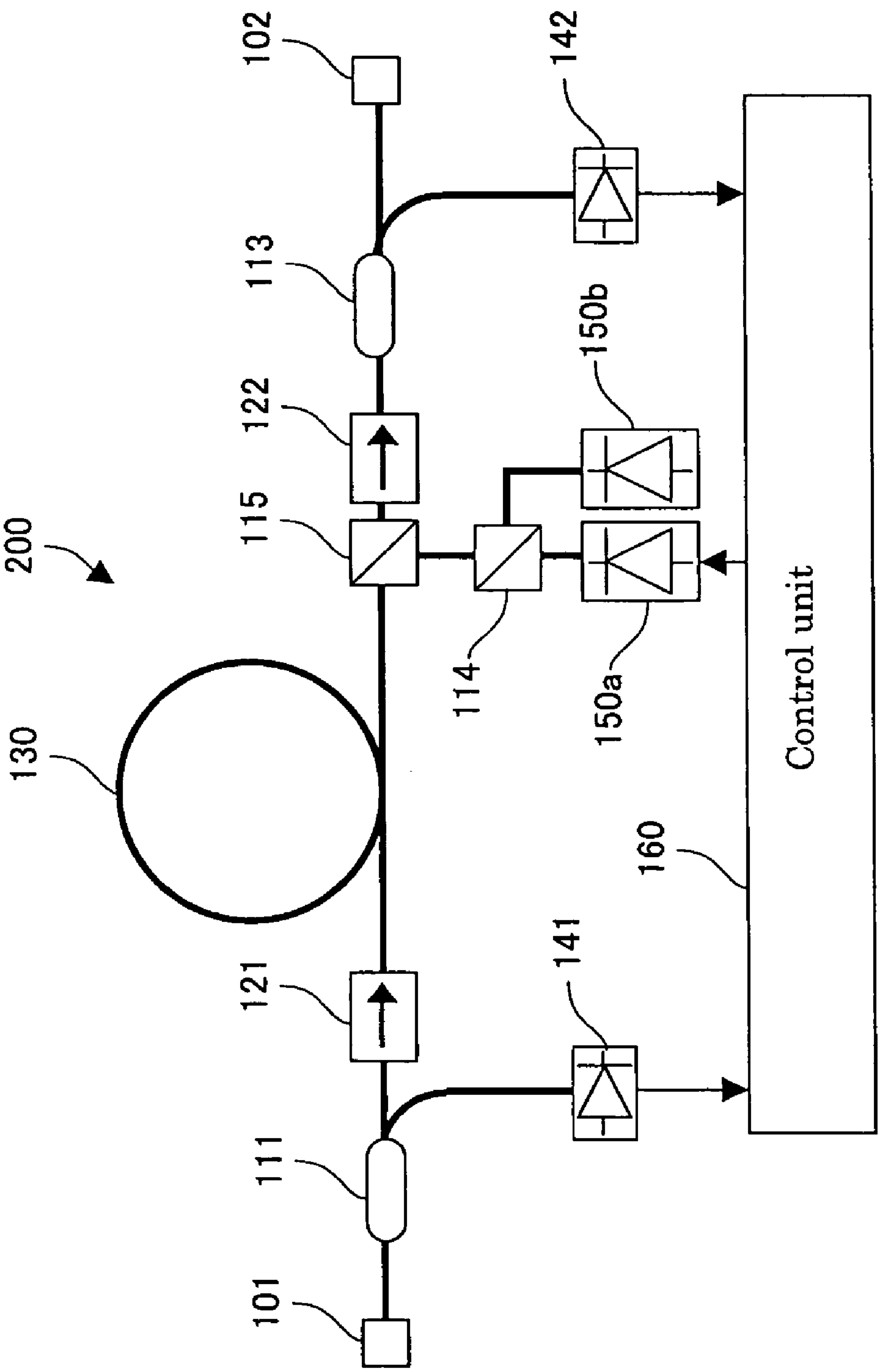
FIG. 4 is a conceptual diagram showing a Raman amplifier of the second embodiment of the present invention.

In the first embodiment, the pump lightwaves having a plurality of wavelengths are supplied to the optical fiber 130 in the same direction as that of the signal lightwave. Next, the second embodiment is explained in which the pump lightwaves having a plurality of wavelengths are supplied to the optical fiber 130 in the direction opposite to that of the signal lightwave. FIG. 4 is a conceptual diagram showing a Raman amplifier 200 of the second embodiment of the present invention. In the second embodiment, a fiber optic coupler 115 for supplying pump lightwaves having a plurality of wavelengths to the optical fiber 130 is placed between the optical fiber 130 and an optical isolator 122 on the path of a signal lightwave.

The fiber optic coupler 115 receives pump lightwaves having a plurality of wavelengths outputted from the fiber optic coupler 114 and supplies them to the Raman-amplifying optical fiber 130. In addition, the fiber optic coupler 115 receives a signal lightwave outputted from the optical fiber 130 and supplies it to the optical isolator 122.

An example of this embodiment is explained below. It is assumed that the conditions for the optical fiber 130, the signal lightwave, and the pump lightwave outputted from each of the laser diodes 150*a* and 150*b* are the same as those in the first embodiment.

Figure 5:
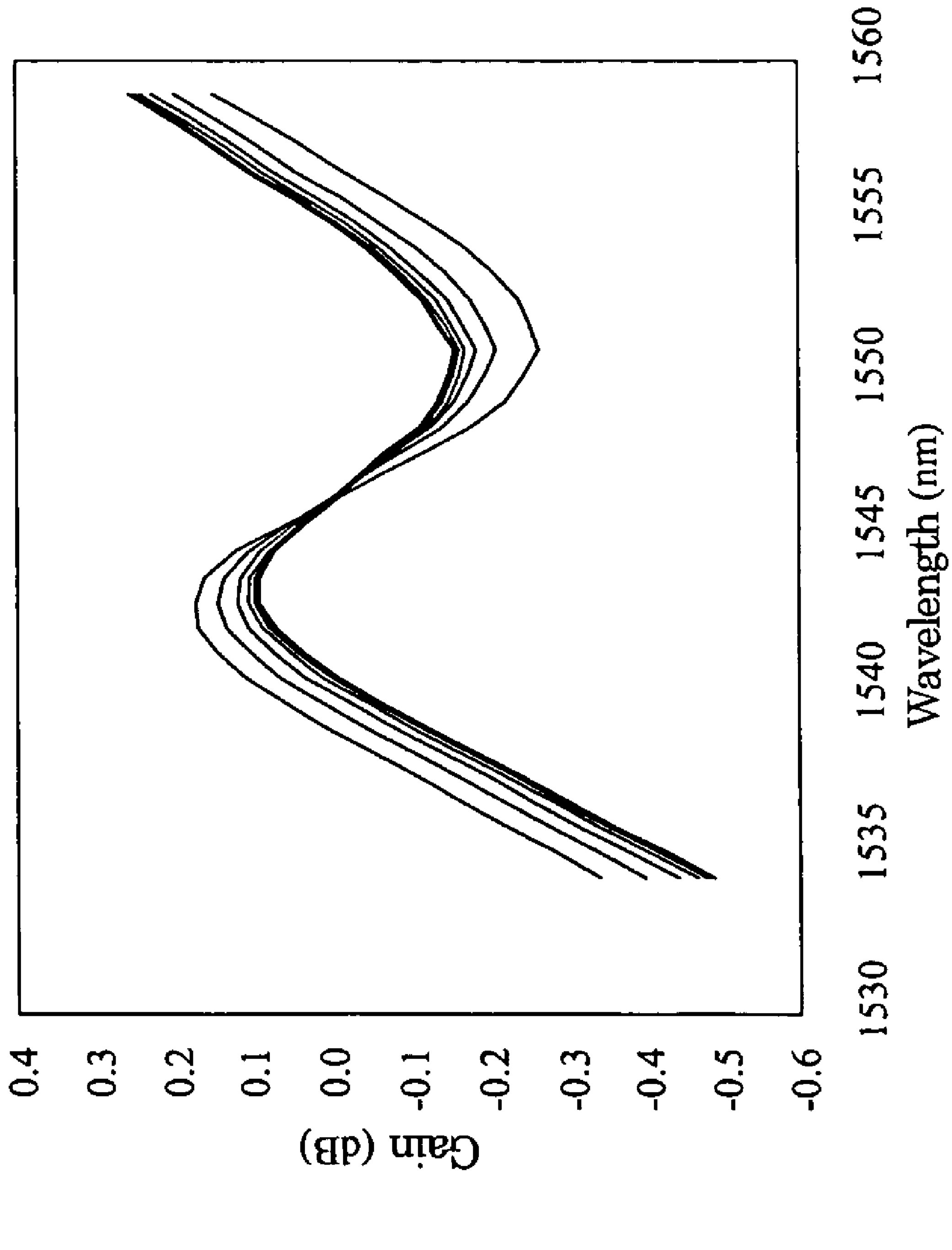
FIG. 5 is a graph showing a gain spectrum of a Raman amplifier of the second embodiment using the power of the input signal lightwave as a parameter.

FIG. 5 is a graph showing a gain spectrum of a Raman amplifier of the second embodiment using the power of the input signal lightwave as a parameter. Even though the power of the input signal lightwave was varied from −32 dBm/ch to −5 dBm/ch (the variation is 27 dBm/ch), the gain variation was suppressed to about ±0.15 dBpp.

Figure 6:
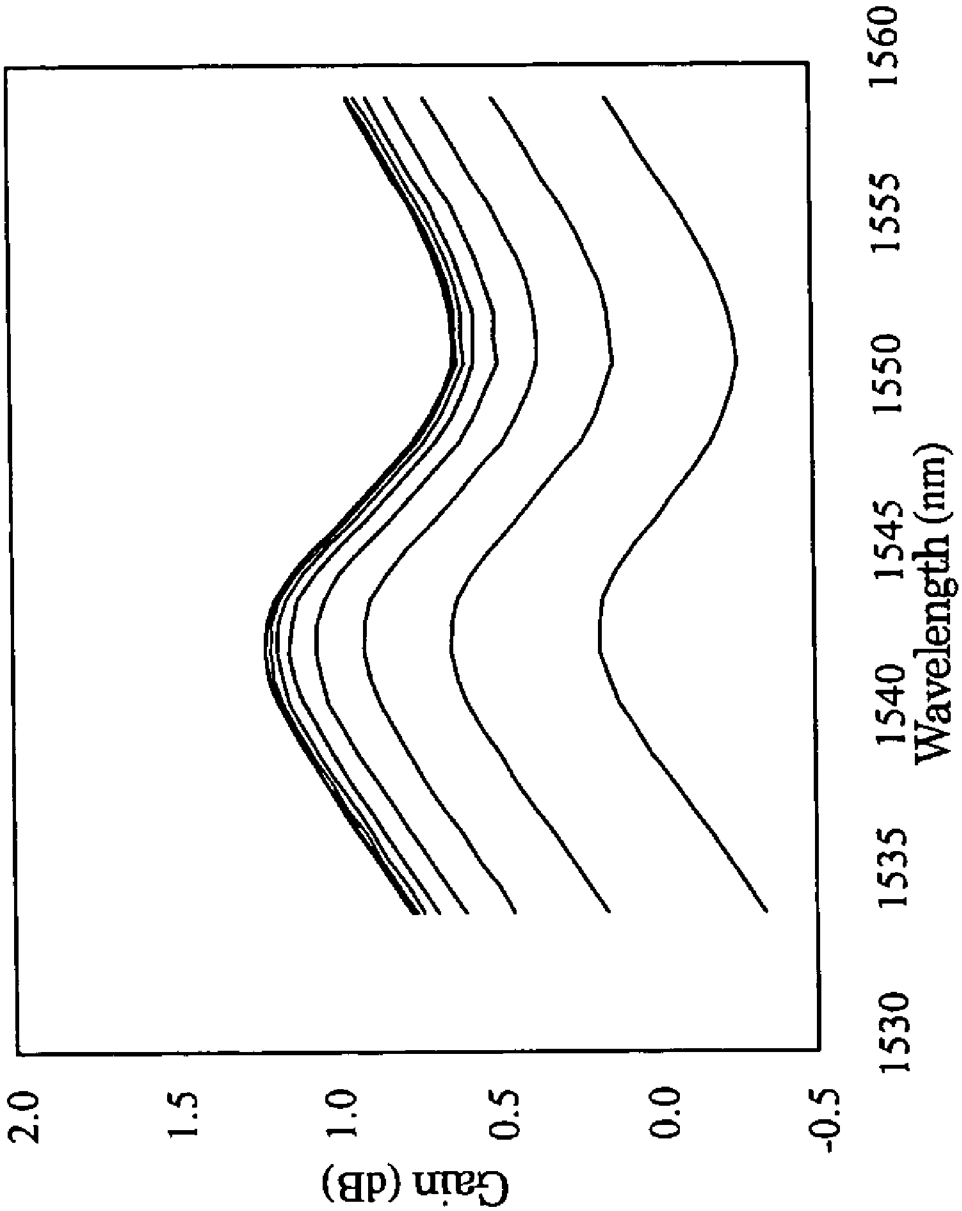
FIG. 6 is a graph showing a gain spectrum of a Raman amplifier of the second embodiment using the power of the input signal lightwave as a parameter when the power of the pump lightwaves was maintained constant as a comparative example.

FIG. 6 is a graph showing a gain spectrum of a Raman amplifier of the second embodiment using the power of the input signal lightwave as a parameter when the power of the pump lightwaves was maintained constant as Comparative example 2. In Comparative example 2, a gain variation of about 1.0 dBpp was produced at the maximum. In this case, the comparison of the result with that obtained in the case of the forward pumping shown in FIG. 3 shows that the forward pumping produces a larger amount of variation in gain resulting from the variation in the power of the input signal lightwave. The reason for this is that the Raman amplification by the forward pumping creates gain saturation more readily.

The Third Embodiment

The present inventor, in examining and studying the first and second embodiments and others, found that there is a relationship between the power of the pump lightwave having the shortest wavelength for rendering the gain of the Raman amplification constant and the power of the input signal lightwave.

Figure 7:
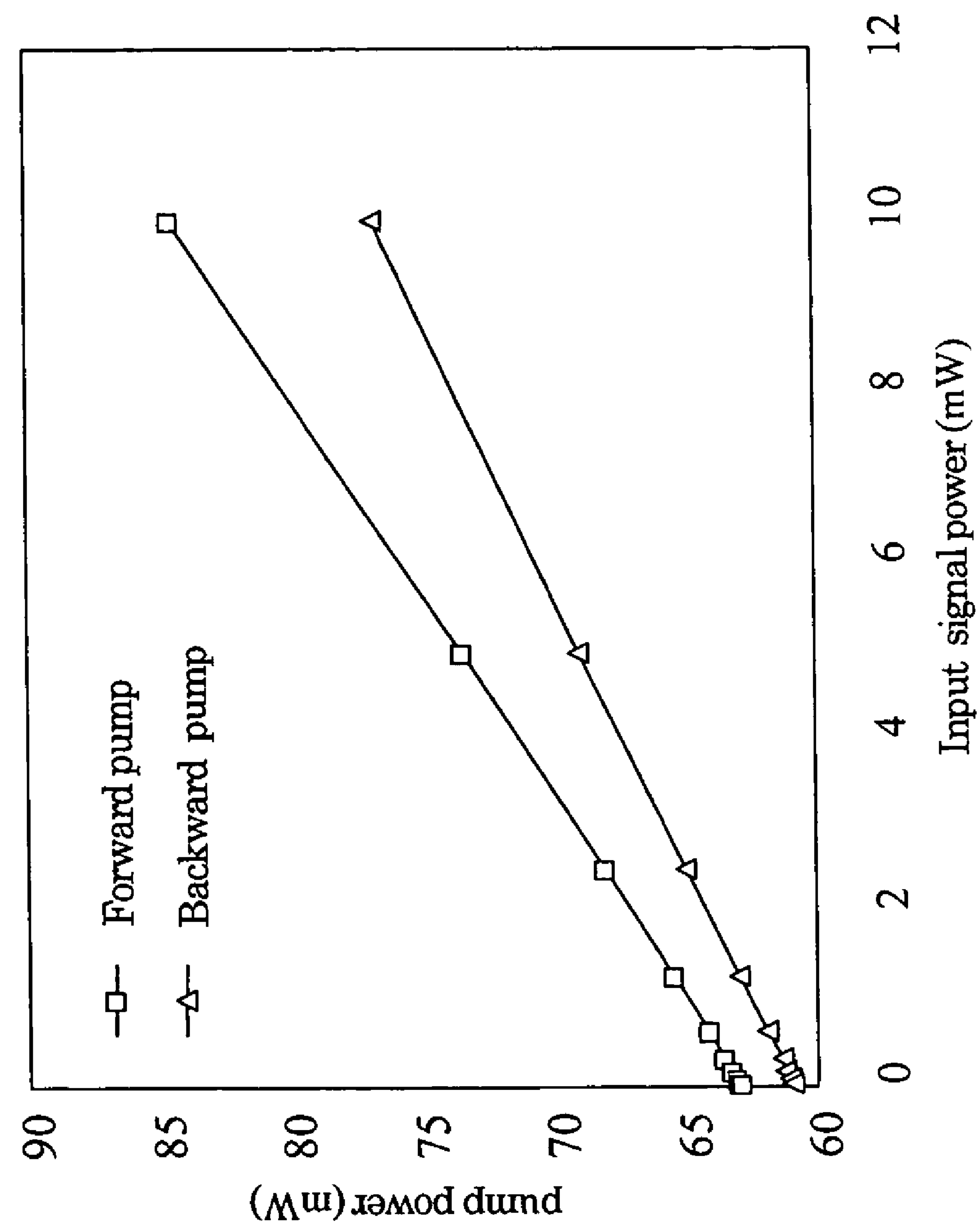
FIG. 7 is a graph showing the relationship between the power of the input signal lightwave and the power of the pump lightwave having the shortest wavelength when the pump lightwave having the shortest wavelength is controlled such that the average gain becomes constant in the first and second embodiments.

FIG. 7 is a graph showing the relationship between the power of the input signal lightwave and the power of the pump lightwave having the shortest wavelength (the pump lightwave that is outputted from the laser diode 150*a* and that has a wavelength of 1,435.4 nm) when the pump lightwave having the shortest wavelength is controlled such that the average gain becomes constant in the first and second embodiments. The power of the input signal lightwave and the power of the pump lightwave having the shortest wavelength have a relationship expressed as a linear function.

Figure 8:
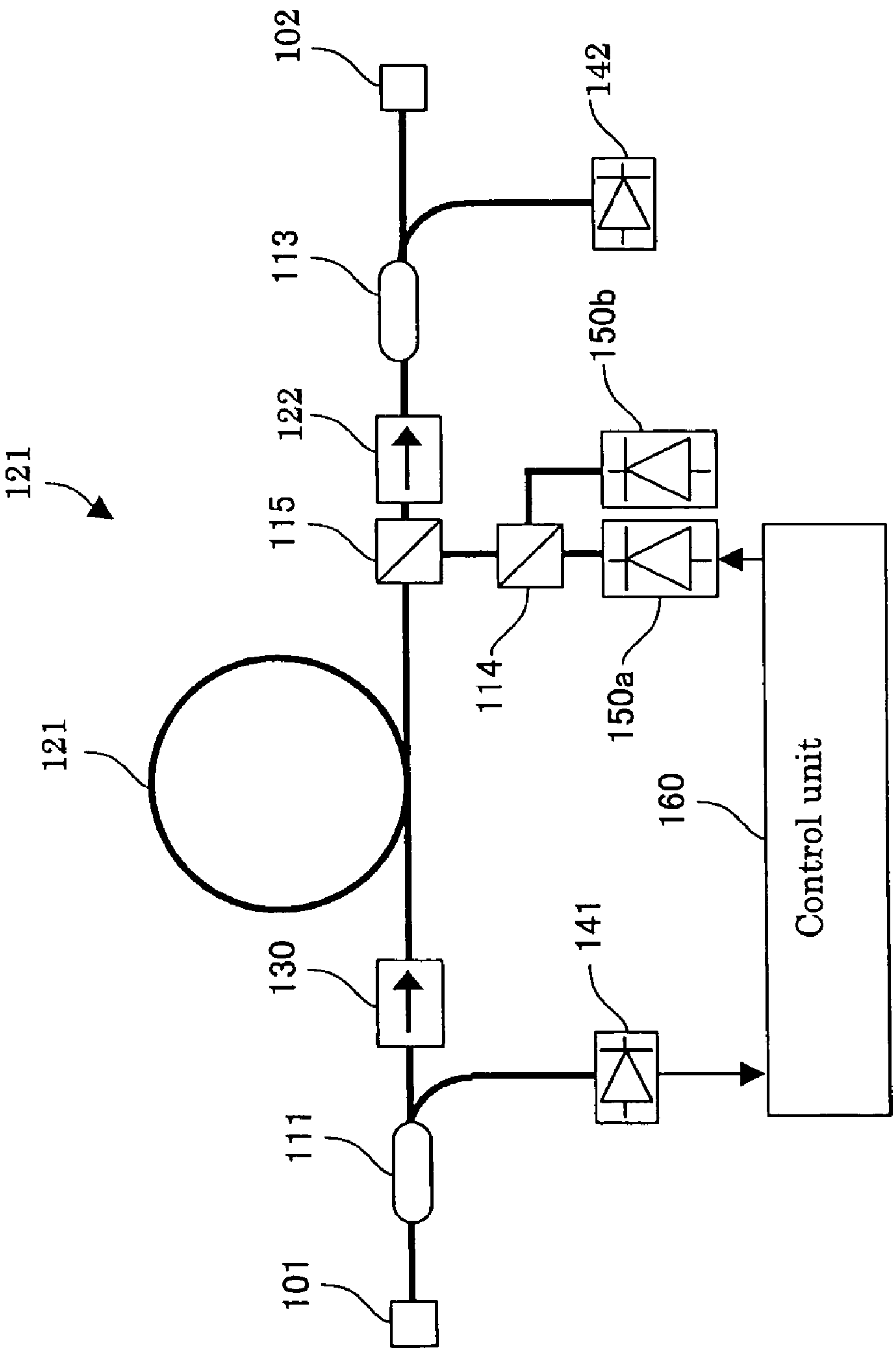
FIG. 8 is a conceptual diagram showing a Raman amplifier of the third embodiment of the present invention.

The third embodiment utilizes this relationship to control the gain of the Raman amplification. FIG. 8 is a conceptual diagram showing a Raman amplifier 300 of the third embodiment of the present invention. FIG. 8 shows that the control unit 160 receives only the electric signal outputted from the photodiode 141. The control unit 160 memorizes the above-described relationship and, based on this relationship, calculates the power of the pump lightwave having the shortest wavelength using the monitored power of the input signal lightwave. Then, the control unit 160 controls the power of the pump lightwave to be outputted from the laser diode 150*a* so that the power can coincide with the calculated value. More specifically, the power of the pump lightwave having the shortest wavelength is calculated using the following equation expressed as a linear function:

the power of the pump lightwave having the shortest wavelength (mW)= $a\times$the power of the input signal lightwave (mW)+$b$, where "a" and "b" are constants.

This embodiment demonstrates that the gain variation in the Raman amplification can be easily reduced when the power of the pump lightwave having the shortest wavelength is controlled based on the relationship between the power of the pump lightwave having the shortest wavelength and the power of the input signal lightwave to be established to maintain the gain constant, especially a relationship expressed as a linear function.

When the power of the pump lightwave having the shortest wavelength is controlled so that the average gain can be maintained constant, the relationship between the power of the input signal lightwave and the power of the pump lightwave having the shortest wavelength, which relationship is expressed as a linear function, is established even in the case of the bidirectional pumping. In this case, when the shortest wavelength of the forward pumping lightwave differs from that of the backward pumping lightwave, only the pump lightwave having a shorter wavelength needs to be controlled. When the shortest wavelength of the forward pumping lightwave is the same as that of the backward pumping lightwave, both the pump lightwaves having the same shortest wavelength need to be controlled under the condition that they have the same power.

The Fourth Embodiment

During the operation of a Raman amplifier, when the power of the input signal lightwave varies abruptly, the gain of the Raman amplification varies transiently. Therefore, in order to control the gain so that it can remain constant without transient variations even when the power of the input signal lightwave varies abruptly, it is necessary to control the gain at high speed so that the gain can maintain the fixed value. Generally, a Raman-amplifying optical fiber has a length of at least several kilometers, which is longer than that of a rare-earth-doped fiber amplifier. Consequently, it is necessary to design the control system considering the time during which the signal lightwave travels over the Raman-amplifying optical fiber.

In a backward pumping Raman amplifier, the transient variation in gain can be suppressed by equalizing the time from the variation of the power of the input signal lightwave to the variation of the power of the pump lightwave with the time during which the signal lightwave travels over the Raman-amplifying optical fiber. Therefore, in a backward pumping Raman amplifier, it is desirable that the feedforward control system for controlling the power of the pump lightwave by detecting the power of the input signal lightwave be provided with a retarding means for giving a retarding time that is equal to the time during which the signal lightwave travels over the Raman-amplifying optical fiber. Two types of retarding means are available: one gives a retarding time on an electric circuit, and the other is an optical retarding medium.

Figure 9:
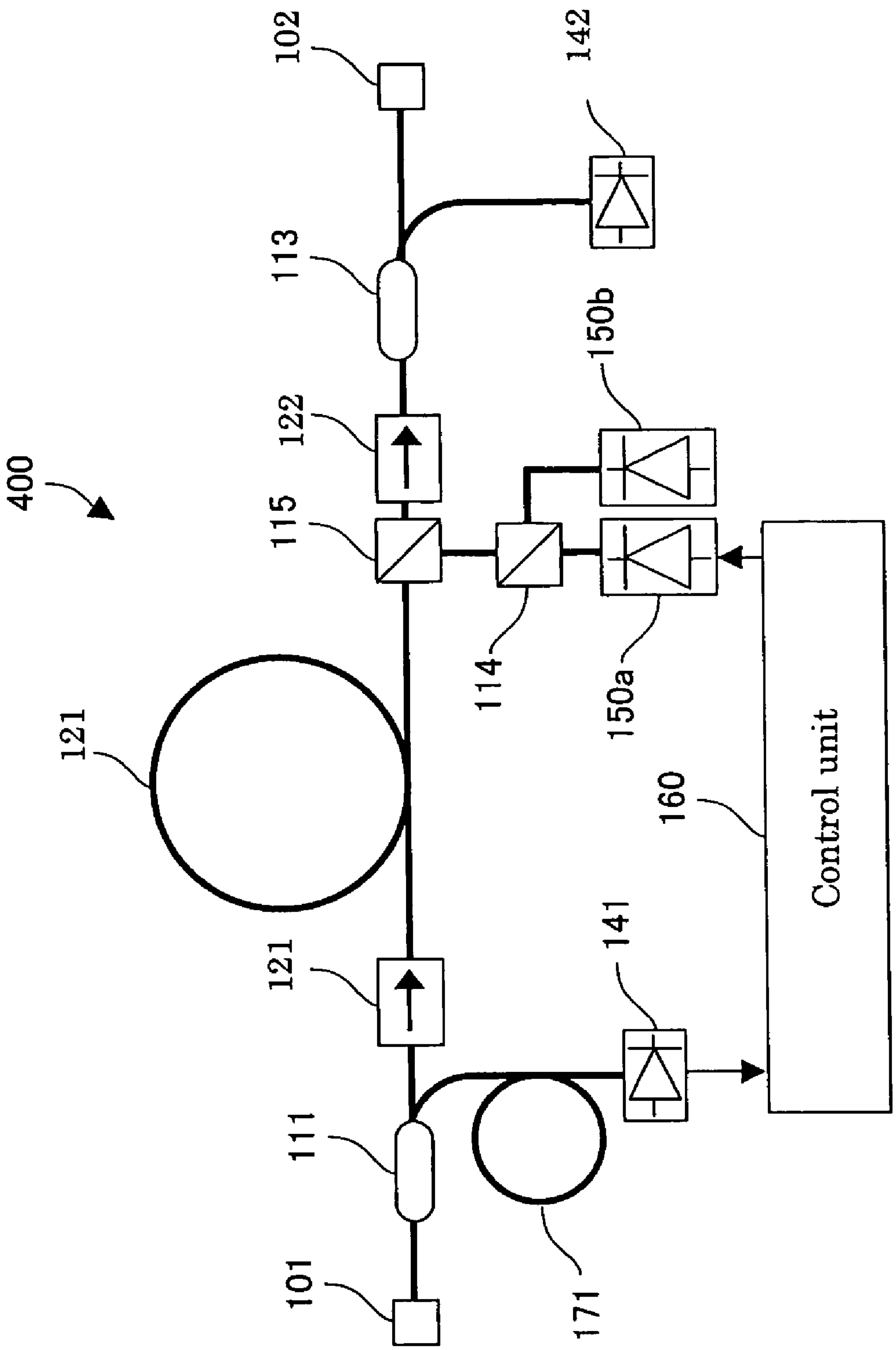
FIG. 9 is a conceptual diagram showing a Raman amplifier of the fourth embodiment of the present invention.

FIG. 9 is a conceptual diagram showing a Raman amplifier 400 of the fourth embodiment of the present invention. The Raman amplifier 400 is provided with between the fiber optic coupler 111 and the photodiode 114 a retarding medium 171 for retarding the signal lightwave by a predetermined time. As the retarding medium 171, it is desirable to use a retarding fiber or the like. Here, it is desirable that the predetermined time be a time that gives a proper timing to the control unit 160 for controlling the laser diode 150*a* in consideration of the time during which the signal lightwave travels over the optical fiber 130. For example, it is desirable that the photodiode 141 make reference to the power of the signal lightwave at the instant when a time needed for the signal lightwave to travel over the optical fiber 130 has just elapsed from the instant when the fiber optic coupler 111 outputs the signal lightwave to the retarding fiber 171.

The above-described structure enables the control of the power of the pump lightwave in consideration of the time during which the signal lightwave travels over the optical fiber 130. As a result, this embodiment can suppress the transient variation in the gain of the Raman amplification.

The above description is for the backward pumping Raman amplifier. In the forward pumping Raman amplifier, the transient variation in the gain can be suppressed by varying the power of the pump lightwave nearly concurrently with the variation in the power of the input signal lightwave. However, because a control circuit usually has a response time, it is extremely difficult to control the power of the pump lightwave concurrently with the variation in the power of the input signal lightwave.

Figure 10:
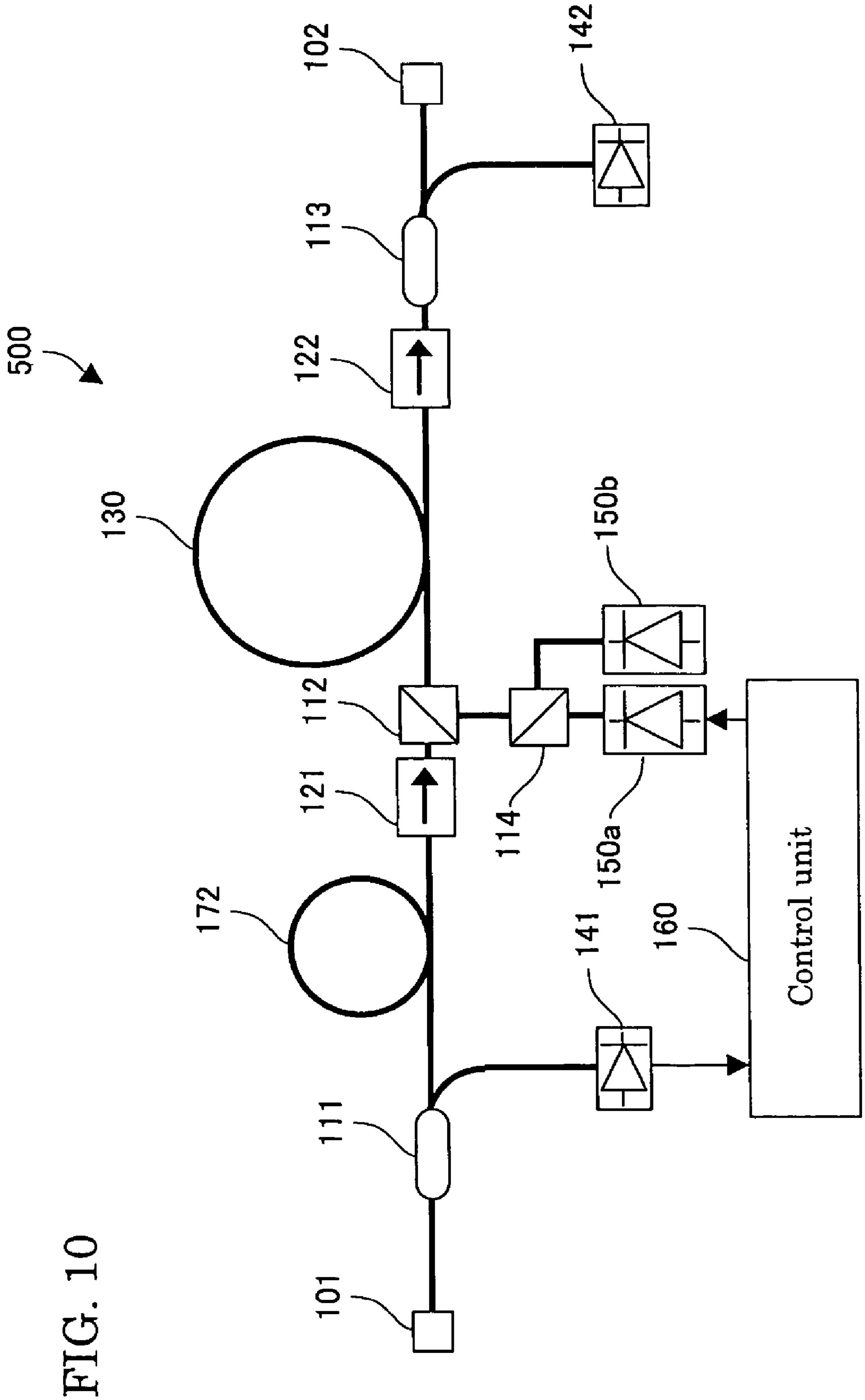
FIG. 10 is a conceptual diagram showing a Raman amplifier of the fifth embodiment of the present invention.

FIG. 10 is a conceptual diagram showing a Raman amplifier 500 of the fifth embodiment of the present invention. The Raman amplifier 500 shown in FIG. 10 suppresses the transient variation in the gain in the forward pumping. The Raman amplifier 500 is provided with between the fiber optic coupler 111 and the optical isolator 121 a retarding medium 172 for retarding the signal lightwave by a predetermined time. Here, it is desirable that the predetermined time be a time that elapses from the instant when the photodiode 141 receives the signal lightwave to the instant when the control unit 160 carries out the control by referring to the power of the inputted signal lightwave. The above-described structure can suppress the transient variation in the gain of the Raman amplification because the signal lightwave is inputted into the optical fiber 130 nearly concurrently together with the pump lightwave controlled in accordance with the power of the signal lightwave.

The Raman amplifier having the above-described structure can perform the control that takes into consideration the time from the detection of the power of the input signal lightwave to the control of the power of the pump lightwave.

Figure 11:
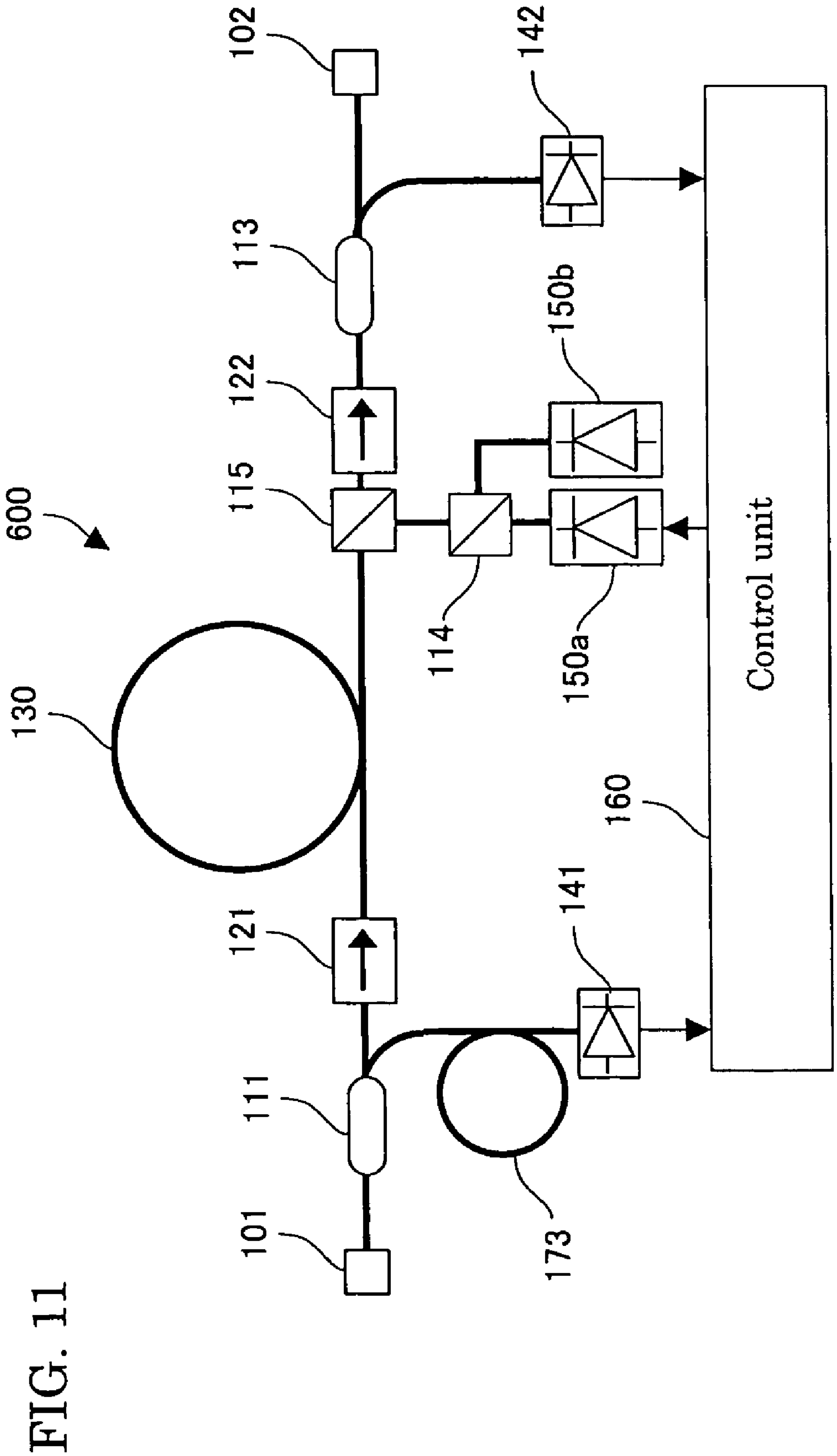
FIG. 11 is a conceptual diagram showing a Raman amplifier of the sixth embodiment of the present invention.

In addition, in the system that monitors both the powers of the input and output lightwaves, also, a time difference corresponding to the length of the optical fiber occurs between the monitoring of the input signal lightwave and the monitoring of the output signal lightwave. FIG. 11 is a conceptual diagram showing a Raman amplifier 600 of the sixth embodiment of the present invention. The Raman amplifier 600 shown in FIG. 11 prevents the time difference from occurring in this system. The Raman amplifier 600 is provided with between the fiber optic coupler 111 and the photodiode 141 a retarding medium 173 for retarding the signal lightwave by a predetermined time. Here, it is desirable that the predetermined time be a time that prevents the occurrence of the time difference between the monitoring of the input signal lightwave and the monitoring of the output signal lightwave. The above-described structure can not only suppress the transient variation in the gain of the Raman amplification but also detect the gain with high precision in time.

The present invention is described above in connection with what is presently considered to be the most practical and preferred embodiments. However, the invention is not limited to the disclosed embodiments, but, on the contrary, is intended to cover various modifications and equivalent arrangements included within the spirit and scope of the appended claims.

The entire disclosure of Japanese patent application 2004-128889 filed on Apr. 23, 2004 including the specification, claims, drawing, and summary is incorporated herein by reference in its entirety.

What is claimed is:

1. A Raman amplifier comprising:

(a) an optical fiber that amplifies an input lightwave to produce an output lightwave;

(b) a pump-lightwave-supplying means that supplies pump lightwaves having a plurality of wavelengths to the optical fiber; and (c) a control unit that controls only the power of the pump lightwave having the shortest wavelength among the pump lightwaves so that the average value of the gain of the Raman amplification in the optical fiber in an intended wavelength range can be maintained constant.

2. A Raman amplifier as defined by claim 1, the Raman amplifier further comprising an input-power-detecting means that detects the power of the input lightwave;

the control unit further configured to perform the functions of:

(a) memorizing a relationship between the power of the pump light-wave having the shortest wavelength and the power of the input lightwave to be established to maintain the average value constant; and (b) controlling the power of the pump lightwave having the shortest wavelength in accordance with both the power of the input lightwave detected by the input-power-detecting means and the relationship it memorizes.

3. A Raman amplifier as defined by claim 2, wherein the relationship is a relationship expressed as a linear function.

4. A Raman amplifier as defined by claim 2, wherein:

(a) the pump-lightwave-supplying means supplies to the optical fiber the pump lightwaves in the direction opposite to the travelling direction of the input lightwave; and (b) one of the input-power-detecting means and the control unit is provided with a retarding means for giving a retarding time corresponding to the time needed for the input lightwave to travel over the optical fiber.

5. A Raman amplifier as defined by claim 2, the pump-lightwave-supplying means supplying to the optical fiber the pump lightwaves in the same direction as the travelling direction of the input lightwave;

the Raman amplifier further comprising a retarding medium for retarding the input lightwave by a predetermined time, the retarding medium being placed between the input-power-detecting means and the pump-lightwave-supplying means both placed on a path for the input lightwave.

6. A Raman amplifier as defined by claim 5, wherein the predetermined time is the time from the instant when the input-power-detecting means detects a value to the instant when the control unit performs the control.

7. A Raman amplifier as defined by claim 1, the Raman amplifier further comprising:

(d) an input-power-detecting means that detects the power of the input lightwave; and (e) an output-power-detecting means that detects the power of the output lightwave;

the control unit further configured to control the power of the pump lightwave having the shortest wavelength in accordance with both the power of the input lightwave detected by the input-power-detecting means and the power of the out-put lightwave detected by the output-power-detecting means.

8. A Raman amplifier as defined by claim 7, wherein the control unit controls the power of the pump lightwave having the shortest wavelength in accordance with both the power of the input lightwave detected by the input-power-detecting means and the power of the output lightwave detected by the output-power-detecting means, the power of the output lightwave being detected at the instant when a time needed for the input lightwave to travel over the optical fiber has just elapsed from the instant when the power of the input lightwave is detected.

* * * * *